(12) United States Patent
Harris et al.

(10) Patent No.: US 8,225,919 B2
(45) Date of Patent: Jul. 24, 2012

(54) RELEASABLE DRIVE ARRANGEMENT

(75) Inventors: Paul Harris, Leighton Buzzard (GB);
Raymond Richard Bomford, Chalfont St Peter (GB); Darren Christopher Howard, Aylesbury (GB)

(73) Assignee: Goodrich Control Systems, Solihull (GB)

( * ) Notice: Subject to any disclaimer, the term of this patent is extended or adjusted under 35 U.S.C. 154(b) by 462 days.

(21) Appl. No.: 12/612,231

(22) Filed: Nov. 4, 2009

(65) Prior Publication Data

US 2010/0108458 A1    May 6, 2010

(30) Foreign Application Priority Data

Nov. 5, 2008  (GB) .................................. 0820232.7

(51) Int. Cl.
*F16D 11/14* (2006.01)
*F16D 23/12* (2006.01)
*H02P 9/06* (2006.01)

(52) U.S. Cl. .................... 192/69.2; 192/101; 192/113.5; 192/114 R; 322/12

(58) Field of Classification Search .............. 192/24, 192/56.53, 69.2, 69.82, 34, 90; 322/12
See application file for complete search history.

(56) References Cited

U.S. PATENT DOCUMENTS

| | | | |
|---|---|---|---|
| 2,727,371 A * | 12/1955 | Troeger et al. ............... | 192/69.2 |
| 2,802,555 A * | 8/1957 | Kalikow ...................... | 192/69.2 |
| 3,001,620 A * | 9/1961 | Olchawa et al. .............. | 192/69.2 |
| 4,086,991 A | 5/1978 | Swadley | |
| 4,244,455 A | 1/1981 | Loker | |
| 4,269,293 A * | 5/1981 | Martin ........................... | 192/94 |
| 4,641,737 A * | 2/1987 | Gillingham et al. .......... | 192/141 |
| 4,936,247 A | 6/1990 | Sundstrom | |
| 5,718,313 A | 2/1998 | Sekine | |
| 6,513,634 B2 | 2/2003 | Cooper | |
| 6,619,454 B2 | 9/2003 | Hayward | |

FOREIGN PATENT DOCUMENTS

| | | |
|---|---|---|
| DE | 727540 | 11/1942 |
| DE | 3914049 | 5/1990 |
| EP | 1548311 | 6/2005 |
| FR | 5092000 | 11/1920 |
| GB | 1 520 616 | 8/1978 |

OTHER PUBLICATIONS

European Search Report dated Apr. 18, 2011.

* cited by examiner

*Primary Examiner* — Rodney Bonck
(74) *Attorney, Agent, or Firm* — Andrus, Sceales, Starke & Sawall, LLP

(57) ABSTRACT

A drive arrangement comprising a drive shaft, a clutch arrangement operable, upon axial movement of the drive shaft occurring, to interrupt drive to the drive shaft, an axially movable interrupt shaft, a gear arrangement whereby the interrupt shaft is driven for rotation by the drive shaft at a speed slower than the rotary speed of the drive shaft, a disconnect device operable to cause axial movement of the interrupt shaft, and a transmission device for transmitting axial movement of the interrupt shaft to the drive shaft.

9 Claims, 2 Drawing Sheets

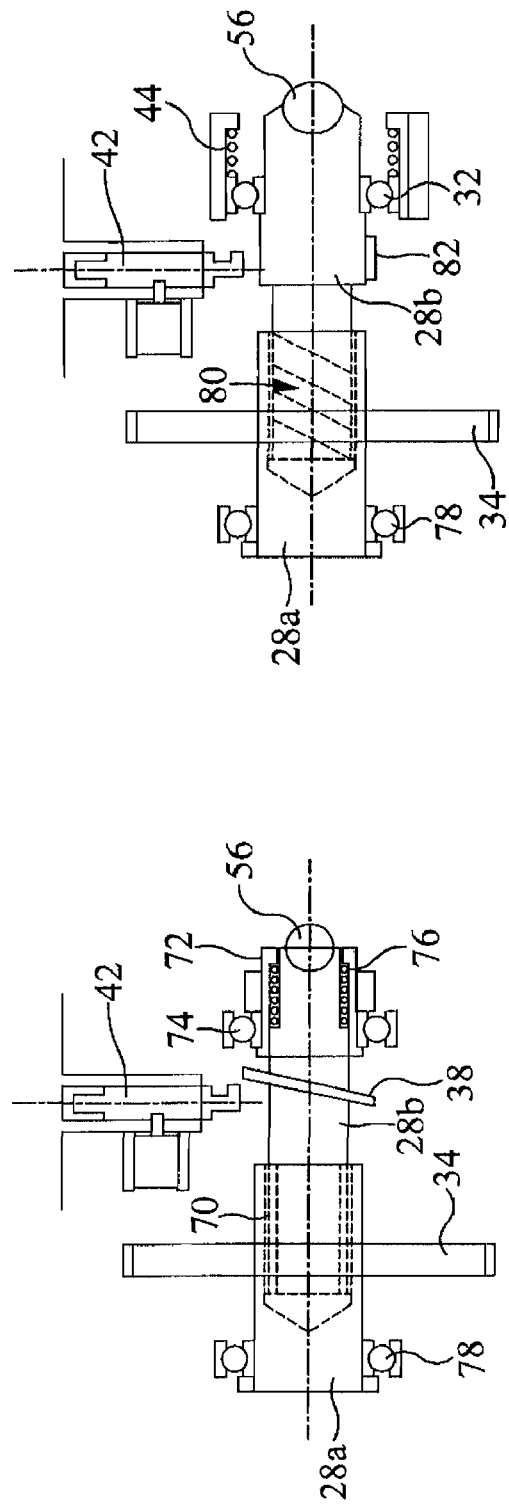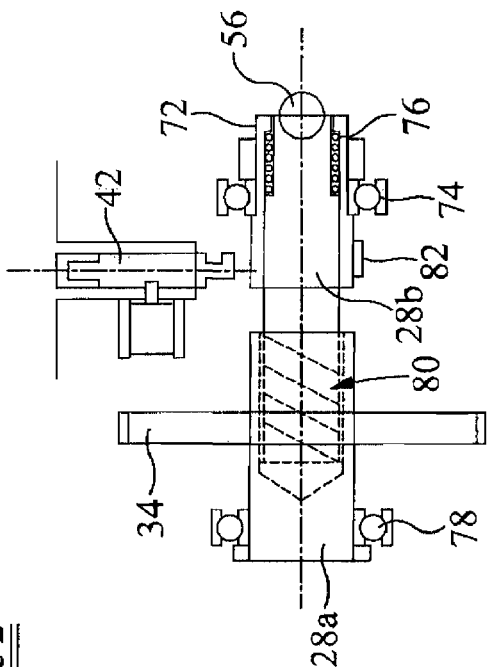

RELEASABLE DRIVE ARRANGEMENT

Figure 1:
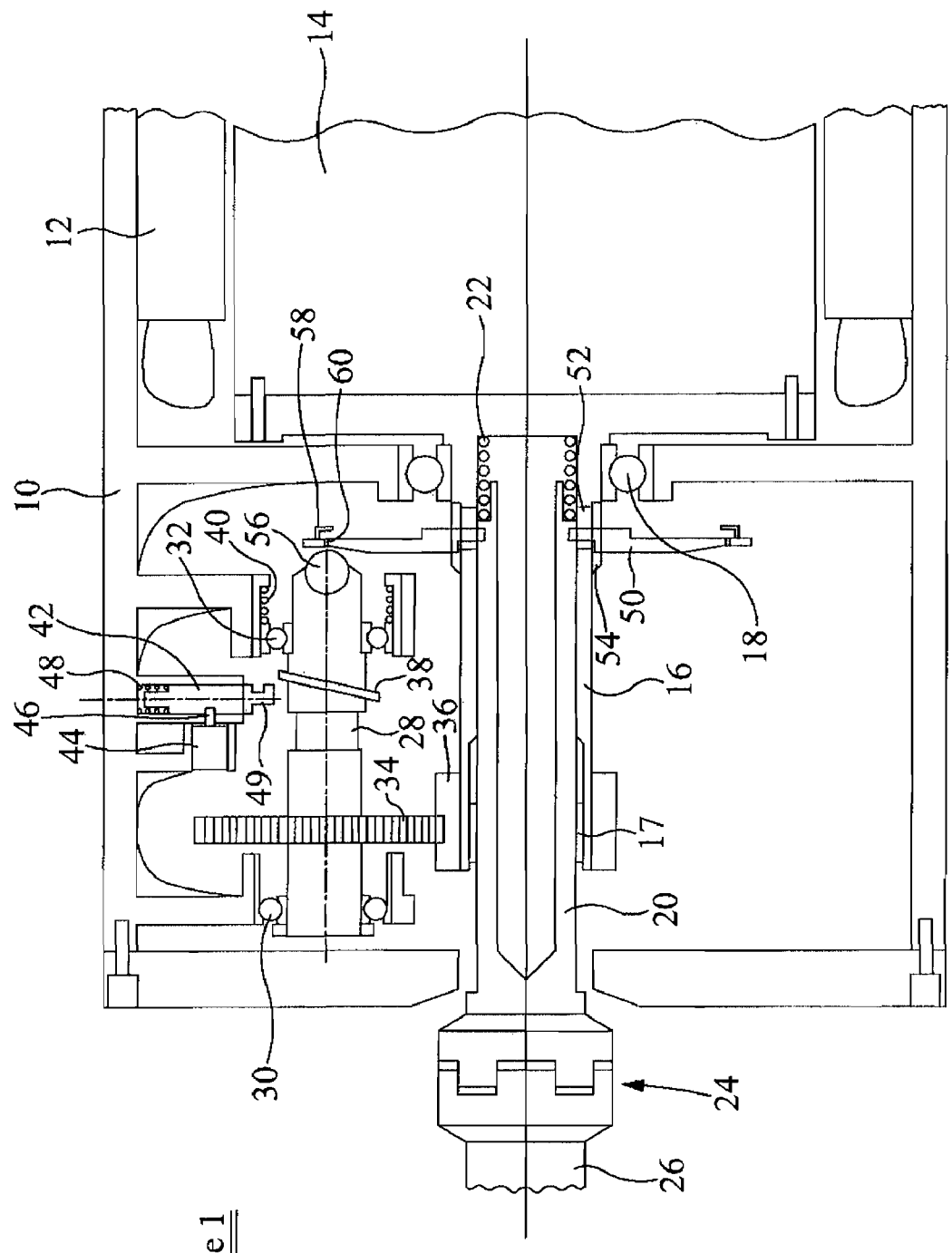

This invention relates to a drive arrangement and in particular to a releasable drive arrangement, for example suitable for use in the transmission of rotary drive to an electrical generator.

Variable speed electrical generators for use in aerospace applications, and starter generators, are typically arranged to be driven from an accessory gearbox which, in turn, is driven by an associated gas turbine engine. In order to allow the generator to produce an adequate electrical output when the engine is operating at idle speed, the input to the generator is geared up by a large amount. However, the step-up gearing results in very high operating speeds being reached when the associated engine is operating at its maximum operating speed. For example, in order to ensure that an adequate electrical output is achieved when the engine is operating at idle speed of a few hundred rpm, the step-up gearing is sufficiently high that operating speeds in the order of around 30000 rpm may be reached when the engine is operating at full speed, or in overspeed situations.

With the generator operating at such high speeds, it is desirable to provide a releasable drive or disconnect arrangement whereby drive to the generator can be disconnected if it is sensed that a fault has developed or is developing within the generator or associated systems, such disconnection preventing or reducing further damage to the generator or other components. For example, if it is sensed that a fault in the supply of lubricating oil to the generator has occurred, that there has been a bearing failure, or that another mechanical fault has occurred, the disconnect arrangement may be operated to interrupt drive to the generator.

Various forms of disconnect arrangement are known. For example, U.S. Pat. No. 6,513,634, U.S. Pat. No. 6,619,454 and U.S. Pat. No. 4,086,991 all describe arrangements in which a component is provided in the drive arrangement which, when molten, results in drive being interrupted. The material may melt as a result of an over-temperature condition arising, or may be heated by an associated heater in the event of a fault being detected to interrupt drive. Such arrangements are difficult and/or costly to reset, and cannot be tested during maintenance or servicing operations.

Another form of disconnect is described in, for example, U.S. Pat. No. 4,936,247, and includes a scroll or spiral feature provided upon part of the drive shaft, and a moveable plunger which can be moved between a first position in which it does not contact the scroll or spiral feature and a second position in which such contact occurs. When in its second position, the engagement between the plunger and the scroll or spiral feature urges the drive shaft for axial movement. The axial movement disengages a dog clutch, interrupting drive to the drive shaft. Although such arrangements operate reliably at relatively low operating speeds, for example below 12-15000 rpm, their use in higher speed applications such as those outlined hereinbefore is problematic as there is a tendency for the plunger to be prevented by the high speed rotation of the shaft from moving to its fully deployed, second position, and thus the engagement required to cause axial movement of the drive shaft failing to occur. Further, it may result in damage occurring to the end of the plunger and/or the scroll or spiral formation. The damage may result in the disconnect arrangement becoming inoperable before disconnection has occurred.

U.S. Pat. No. 5,718,313 & GB 1520616 both describe intermittent or releasable drive transmission arrangements.

It is an object of the invention to provide a releasable drive arrangement in which the disadvantages set out above are overcome or are of reduced effect.

According to the present invention there is provided a releasable drive arrangement comprising a drive shaft, a clutch arrangement operable, upon axial movement of the drive shaft occurring, to interrupt drive to the drive shaft, an axially moveable interrupt shaft, a gear arrangement whereby the interrupt shaft is driven for rotation by the drive shaft at a speed slower than the rotary speed of the drive shaft, disconnect means operable to cause axial movement of the interrupt shaft, and transmission means for transmitting axial movement of the interrupt shaft to the drive shaft.

In such an arrangement, when it is desired to interrupt drive, the interrupt shaft is driven for axial movement. The axial movement of the interrupt shaft is transmitted to the drive shaft, causing operation of the clutch arrangement to interrupt drive to the drive shaft. As the interrupt shaft is driven at a reduced rotary speed relative to the drive shaft, the disconnect means operable to cause axial movement of the interrupt shaft may take a range of forms.

The clutch arrangement preferably comprises a dog clutch, but it will be appreciated that other forms of clutch may be used.

The transmission means preferably comprises a flange mounted upon the drive shaft and rotatable therewith, the interrupt shaft being engageable with the flange to urge the flange and drive shaft for axial movement, when desired. Preferably, a bearing arrangement is provided on the interrupt shaft to accommodate rotation of the flange whilst the interrupt shaft is in engagement therewith. The bearing arrangement is preferably lubricated, for example using lubricating oil impinging, in use, upon the flange, a weir serving to collect the oil, and a series of openings being provided to deliver the oil to the bearing arrangement.

Preferably, the disconnect means comprises a scroll or spiral formation provided upon the interrupt shaft, and a plunger moveable between a first position in which it is spaced from the scroll or spiral formation and a second position in which engagement between the plunger and the scroll or spiral formation results in axial movement of the interrupt shaft.

In such an arrangement, the interrupt shaft may be of one piece form, carrying a gear which is moveable, axially, therewith. Alternatively, it may be of two part form, the parts of which are splined or keyed to one another to allow axial movement therebetween whilst resisting relative rotation, the scroll or spiral formation being provided on one of the parts whilst the gear is provided upon the other part. Such an arrangement permits a simplification in the bearing arrangements used to support the interrupt shaft.

Alternatively, the interrupt shaft may be of two part form, interconnected by a threaded connection, a first one of the parts having a stop provided thereon cooperable with a plunger upon movement of the plunger from a first position to a second position to resist rotation of the first part, causing axial movement thereof.

The plunger is preferably spring biased towards its second position, and is held in its first position by a retainer, for example a solenoid operated retainer arrangement.

The invention also relates to an electrical generator comprising a rotor and a stator, and a releasable drive arrangement as defined hereinbefore and operable to transmit drive to the rotor.

It will be appreciated that such arrangements are advantageous in that a reliable disconnect arrangement can be provided in a simple and convenient manner. Further, resetting of the disconnect arrangement can be undertaken, thus testing during servicing and maintenance operations can be undertaken.

The invention will further be described, by way of example, with reference to the accompanying drawings, in which:

FIG. 1 is a view of a releasable drive arrangement in accordance with one embodiment of the invention; and FIGS. 2 to 4 illustrate three alternative embodiments.

Referring firstly to FIG. 1 there is illustrated an electrical generator comprising a housing 10 containing a stator 12 and a rotor 14. The rotor 14 is mounted upon a rotor shaft 16 which is supported for rotation within the housing 10 through bearings 18. A releasable drive arrangement is provided to transmit rotary drive to the rotor shaft 16 from an accessory gearbox (not shown) or the like associated with an aircraft engine. The releasable drive arrangement comprises a rotatable drive shaft 20 which is splined to the rotor shaft 16 by inter-engaging splines 17 to permit limited axial movement of the drive shaft 20 relative to the rotor shaft 16 but resist relative rotation therebetween. A spring 22 is provided to urge the drive shaft 20 to the left in the orientation illustrated to urge a dog clutch arrangement 24 into engagement so as to transmit drive from an input shaft 26 to the drive shaft 20. The spring 22 is arranged to apply a large magnitude loading to the drive shaft 20 to ensure that the dog clutch arrangement 24 remains engaged in normal use.

The releasable drive arrangement further comprises an interrupt shaft 28 supported for rotation within the housing 10 by bearings 30, 32. The outer race of the bearing 30 is adapted to allow axial movement of the inner race and rolling elements thereof such that the bearing 30 takes the form of a slide bearing. The outer race of the bearing 32 is axially moveable, and is biased towards the left, in the orientation illustrated, by a spring 40, the spring 40 thus urging the interrupt shaft 28 to the left. A drive gear 34 is provided upon the interrupt shaft 28, the drive gear 34 cooperating with a gear 36 provided on the rotor shaft 16 to transmit rotation of the drive shaft 20 and rotor shaft 16 to the interrupt shaft 28. The nature of the gear arrangement so provided is such that the interrupt shaft 28 rotates at a speed slower than the rotary speed of the drive shaft 20. The interrupt shaft 28 includes, intermediate its ends, an upstanding scroll or spiral formation 38. The drive gear 34 may additionally be used to drive other generator components, for example oil pumps, without detracting from its function of driving the interrupt shaft 28.

A plunger 42 is supported within the housing 10 adjacent the scroll or spiral formation 38. As illustrated, the plunger 42 is held in a first, outer position by a solenoid operated retainer or latch 44. Energisation of the latch 44 retracts a pin 46 thereof from a recess formed in the plunger 42, allowing a spring 48 to urge the plunger 42 to a second, inner position in which an end 49 thereof cooperates with the scroll or spiral formation 38. The cooperation, in conjunction with rotation of the interrupt shaft 28, urges the interrupt shaft 28 to the right, in the orientation illustrated, against the action of the spring 40. The gear 36 is of dimensions such that the transmission of drive to the interrupt shaft 28 is maintained throughout such axial movement.

Mounted upon the drive shaft 20 is a flange 50, the inner part of the flange 50 including a series of legs extending through slots 52 formed in the rotor shaft 16. A spline arrangement 54 assists in transmitting rotary motion to the flange 50. The flange 50 is positioned so as to be engageable by the interrupt shaft 28, upon axial movement thereof occurring as described hereinbefore, the movement of the interrupt shaft 28 urging the flange 50, and hence the drive shaft 20, to the right in the orientation illustrated.

The end of the interrupt shaft 28 cooperable with the flange 50 is provided with a ball or thrust bearing 56 to accommodate rotary motion of the flange 50 relative to the interrupt shaft 28, when these components are in engagement. Lubricating oil passing through the bearing 18 and impinging upon the flange 50 will tend to collect adjacent the outer periphery of the flange 50 by virtue of the provision of a weir 58 thereon, openings 60 provided in the flange 50 distributing the collected lubricating oil to the bearing 56.

In normal use, the dog clutch arrangement 24 is engaged, by virtue of the action of the spring 22, thus drive is transmitted to the drive shaft 20 and, via splines 17, to the rotor shaft 16. The rotor 14 is thus driven for rotation relative to the stator 12. The interrupt shaft 28 is driven for rotation at a slower speed than the drive shaft 20. The operation of the solenoid latch 44 holds the plunger 42 in its first position, out of contact with the scroll or spiral formation 38, and the spring 44, holds the interrupt shaft 28 out of engagement with the flange 50.

In the event of a fault in the generator or associated components being sensed, energisation of the solenoid latch 44 allows the plunger 42 to move to its second, inner position under the action of the spring 48. In this position, rotation of the interrupt shaft 28 brings the scroll or spiral formation 36 into engagement with the plunger 42, the cooperation therebetween forcing the interrupt shaft 28 to the right in the orientation illustrated, against the action of the spring 40, moving into engagement with the flange 50, and urging the flange 50 and drive shaft 20 to the right against the action of the spring 22. Such movement results in disengagement of the dog clutch arrangement 24 to disconnect the transmission of drive to the generator.

As the interrupt shaft 28 is driven at a reduced speed relative to the drive shaft, the plunger 42 and scroll or spiral formation 36 can operate reliably in driving the interrupt shaft for axial movement. A reliable disconnectable or releasable drive arrangement is thus provided in a simple and convenient manner. Further, manual return of the plunger 42 to the position shown allows the arrangement to be reset in a simple and convenient manner. It will be noted that until the plunger 42 is returned to the position shown, the interrupt shaft 28 will be prevented by the plunger 42 from returning to the reset position and thus the assembly will remain latched in the disconnected position preventing any accidental re-engagement of the clutch 24.

The arrangement of FIG. 2 is similar to that of FIG. 1, but includes an interrupt shaft 28 of two part form. A first part 28a carries the gear 34, a second part 28b carrying the scroll or spiral formation 38. The first and second parts 28a, 28b are interconnected by a spline, or key, arrangement 70. The second part 28b is slidable within and splined to a sleeve 72 supported by a bearing 74, a spring 76 being located between the sleeve 72 and the part 28b. The bearing 74 holds the sleeve 72 against axial movement. The part 28a is supported by a bearing 78. Such an arrangement is advantageous in that the bearings 74, 78 can be of simpler form than the bearings of the arrangement of FIG. 1 as sliding movement does not need to be accommodated by the bearings. Operation of the arrangement of FIG. 2 is very similar to that of FIG. 1, with the exception that, when the plunger 42 occupies its second position, the second part 28b of the interrupt shaft moves to the right, the first part 28a remaining in its original axial position.

FIG. 3 illustrates an arrangement in which the first and second parts 28a, 28b are interconnected by a screw thread formation 80. The second part 28b is provided with one or more stops 82 with which the plunger 42 is engageable. In normal use, the second part 28b occupies its left hand most position, being held in this position by the spring 44, and the parts 28a, 28b rotate together. Upon movement of the plunger 42 to its second position, the plunger 42 abuts the stop 82, preventing rotation of the second part 28b. Continued rotation of the first part 28a, in combination with the threaded cooperation therebetween, results in the second part 28b being driven to the right in the orientation illustrated, bringing the second part 28b into engagement with the flange 50, driving the flange 50 and drive shaft 20 to the right to release the dog clutch arrangement 24. As an alternative to the provision of stops 82, the plunger 42 may be arranged to impose a frictional braking force on the second part 28b thus reducing its speed relative to the first part 28a and causing the part 28b to be driven to the right in the manner described above.

FIG. 4 illustrates an arrangement similar to FIG. 3, but in which the bearing arrangements are simplified by providing the second part 28b within a sleeve 72 similar to that of FIG. 2. For convenience, stops 82 are provided upon the sleeve 72, but it could be provided directly upon the part 28b. Provision of the stop 82 upon the sleeve 72 allows the stop 82 to be of smaller dimensions as axial movement thereof relative to the plunger 42 does not occur.

As with the arrangement of FIG. 1, the arrangements of FIGS. 2 to 4 provide a simple and convenient releasable drive arrangement, which can be reset if desired, and which permits reliable operation even when used in high speed applications.

It will be appreciated that the arrangements described hereinbefore may be modified in a wide range of ways. For example, the dog clutch arrangement may be replaced by another form of disconnect. The means operative to drive the interrupt shaft for axial movement may be modified, and the manner in which the movement of the interrupt shaft 28 is transmitted to the drive shaft 20 may be changed. Further, although in the arrangements described hereinbefore the interrupt shaft 28, gear 34 and flange 50 are located to the driven end of the rotor 14, arrangements are also envisaged in which these components are located to the other end of the rotor 14. In such arrangements, a communicating shaft or shafts may extend through the rotor 14 to transmit rotary drive to one or more of the said components, and to transmit axial movement back to the clutch arrangement. Other modifications and alterations may also be made without departing from the scope of the invention.

The invention claimed is:

1. A drive arrangement comprising a drive shaft, a clutch arrangement operable, upon axial movement of the drive shaft occurring, to interrupt drive to the drive shaft, an axially movable interrupt shaft, a gear arrangement whereby the interrupt shaft is driven for rotation by the drive shaft at a speed slower than the rotary speed of the drive shaft, disconnect means operable to cause axial movement of the interrupt shaft, and transmission means for transmitting axial movement of the interrupt shaft to the drive shaft.

2. An arrangement according to claim 1, wherein the clutch arrangement comprises a dog clutch.

3. An arrangement according to claim 1, wherein the transmission means comprises a flange mounted upon the drive shaft and rotatable therewith, the interrupt shaft being engageable with the flange to urge the flange and drive shaft for axial movement, when desired.

4. An arrangement according to claim 3, wherein a bearing arrangement is provided on the interrupt shaft to accommodate rotation of the flange whilst the interrupt shaft is in engagement therewith.

5. An arrangement according to claim 4, wherein the bearing arrangement is lubricated using lubricating oil impinging, in use, upon the flange, a weir provided on the flange serving to collect the oil, and a series of openings being provided to deliver the oil to the bearing arrangement.

6. An arrangement according to claim 1, wherein the disconnect means comprises a scroll or spiral formation provided upon the interrupt shaft, and a plunger movable between a first position in which it is spaced from the scroll or spiral formation and a second position in which engagement between the plunger and the scroll or spiral formation results in axial movement of the interrupt shaft.

7. An arrangement according to claim 6, wherein the plunger is spring biased towards its second position, and is held in its first position by a retainer.

8. An arrangement according to claim 1, wherein the interrupt shaft is of two-part form, interconnected by a threaded connection, a first one of the parts having a stop provided thereon co-operable with a plunger upon movement of the plunger from a first position to a second position to resist rotation of the first part and causing axial movement thereof.

9. An electrical generator comprising a rotor and a stator, and a releasable drive arrangement comprising a drive shaft, a clutch arrangement operable, upon axial movement of the drive shaft occurring, to interrupt drive to the drive shaft, an axially movable interrupt shaft, a gear arrangement whereby the interrupt shaft is driven for rotation by the drive shaft at a speed slower than the rotary speed of the drive shaft, disconnect means operable to cause axial movement of the interrupt shaft, and transmission means for transmitting axial movement of the interrupt shaft to the drive shaft, the releasable drive arrangement being operable to transmit drive to the rotor.

* * * * *